United States Patent

[11] 3,590,869

| [72] | Inventor | Carl V. Von Linsowe<br>2820 Julio Ave., San Jose, Calif. 95124 |
|---|---|---|
| [21] | Appl. No. | 832,161 |
| [22] | Filed | June 11, 1969 |
| [45] | Patented | July 6, 1971 |

[54] PRESSURE-FLUID-ASSISTED APPARATUS FOR DISCONNECTABLY COUPLING A PAIR OF CONDUITS
16 Claims, 10 Drawing Figs.

| [52] | U.S. Cl. | 137/614.03, 137/344 |
|---|---|---|
| [51] | Int. Cl. | F16l 29/00 |
| [50] | Field of Search | 137/614.03, 614.04; 251/149.1, 149.6, 149.7, 149.8; 285/5, 6 |

[56] References Cited
UNITED STATES PATENTS
3,291,152  12/1966  Comer......................... 137/614.04

*Primary Examiner*—Robert G. Nilson
*Attorney*—Kolisch & Hartwell

ABSTRACT: Apparatus employing pressure fluid assistance for disconnectably coupling a pair of conduits, one of which contains fluid under pressure. The apparatus includes a pair of interconnectable body members attached to the conduits, a pressure-fluid-actuated driver mechanism for driving the two body members together, and a fluid communicator for supplying pressure fluid from the one conduit to the driver mechanism with the body members moved toward one another. The apparatus further includes pressure-fluid-actuated locking mechanism which, during interconnecting of the body members, receives fluid from the fluid communicator, and locks the body members against separation prior to the establishment of fluid communication between the two conduits.

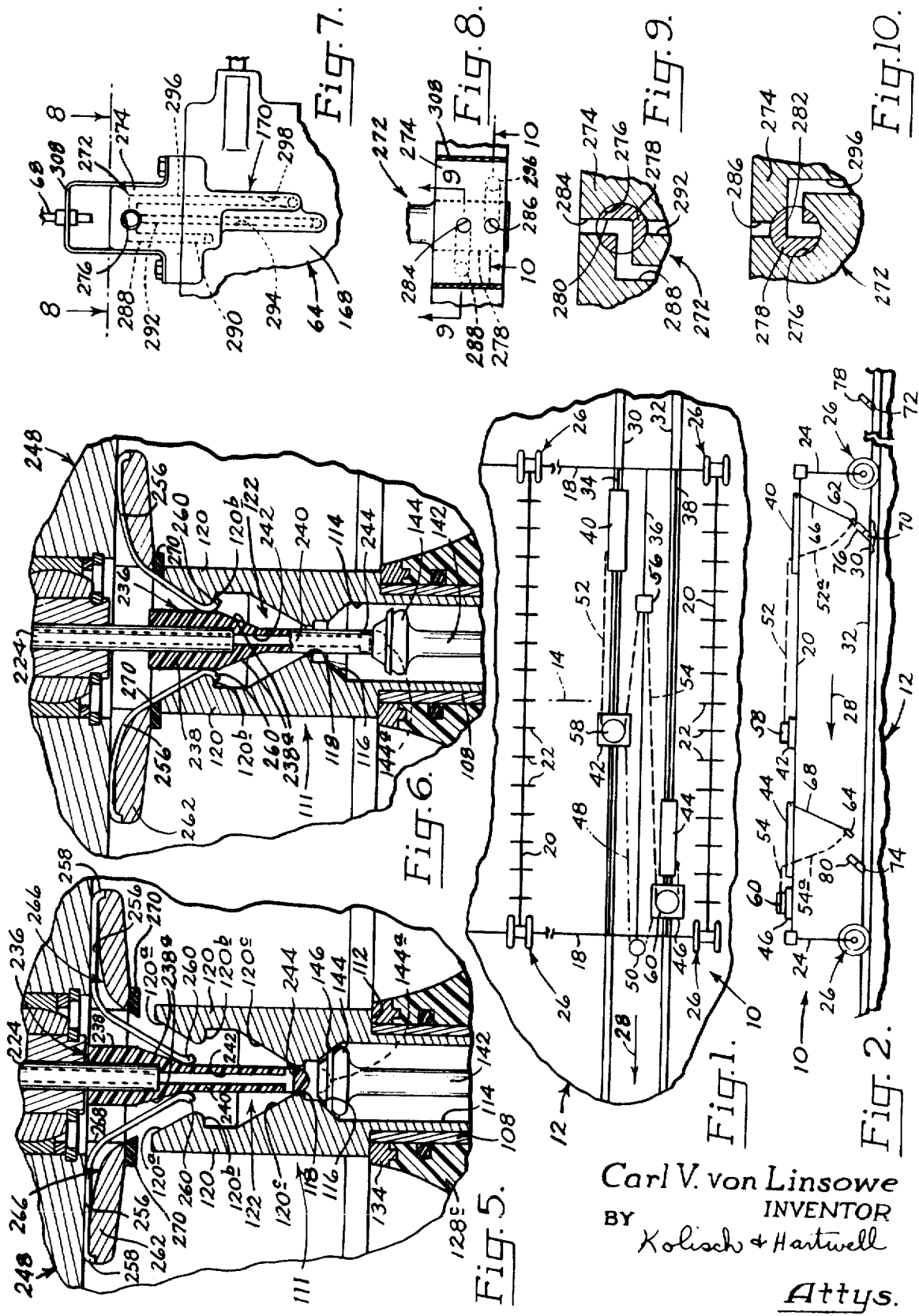

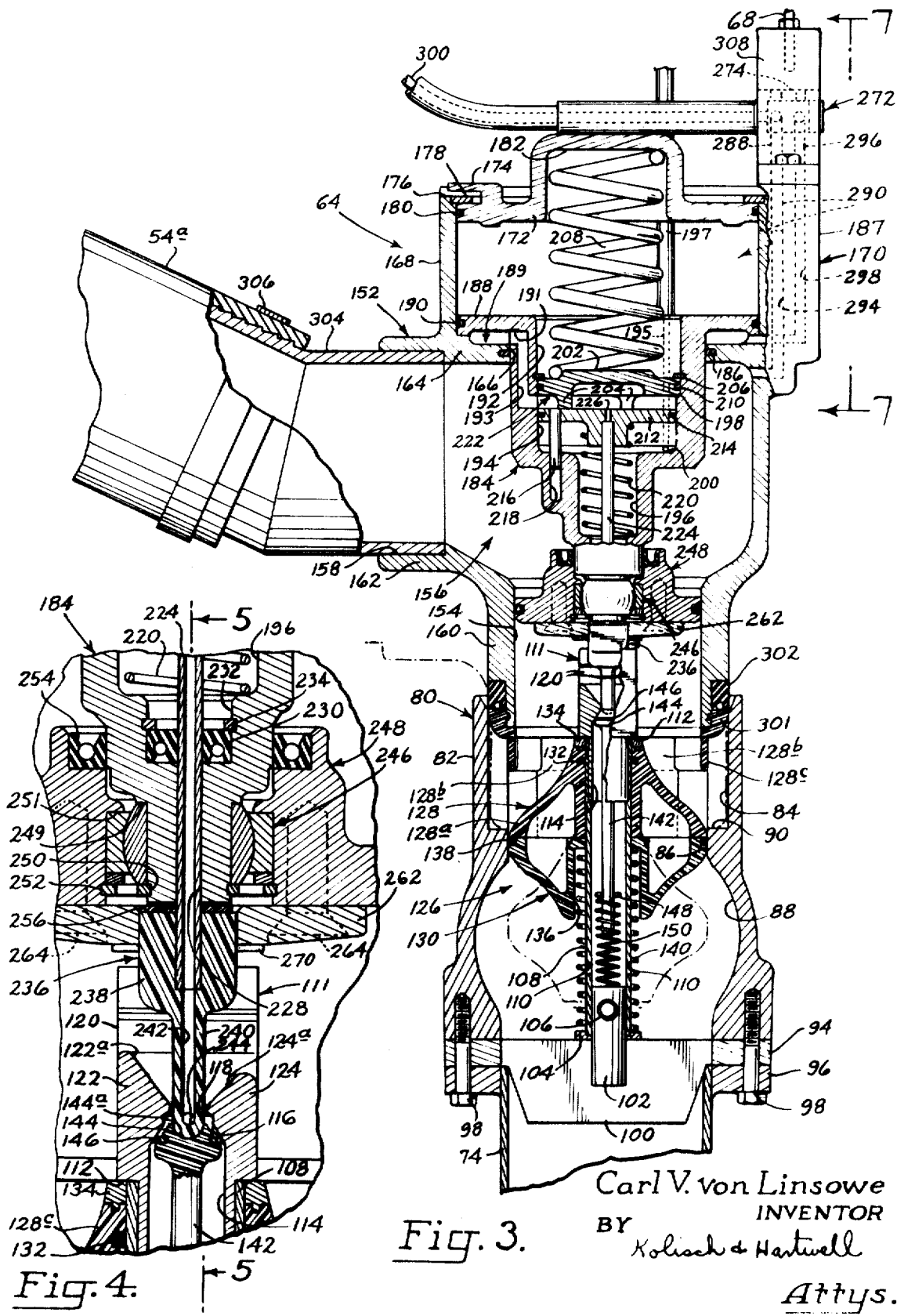

PRESSURE-FLUID-ASSISTED APPARATUS FOR DISCONNECTABLY COUPLING A PAIR OF CONDUITS

This invention pertains to apparatus for disconnectably coupling a pair of conduits where one contains fluid under pressure. For the purpose of illustration, a preferred embodiment of the invention is described in conjunction with supplying water to mobile irrigation apparatus.

There are many applications where it is desired to couple disconnectably a pair of conduits, one of which may contain fluid at a relatively high pressure. For example, in supplying water for irrigation, a connection may be desired between a main water supply conduit containing pressurized water, and a feeder conduit which carries water from the main supply conduit to the means for distributing water over the ground.

Preferably, coupling between such conduits is accomplished through attached interconnectable fittings which contain self-closing flow-control valves that open automatically during interconnection of the fittings to establish communication between the conduits. However, where relatively large diameter conduits and high-fluid pressures are involved, various problems and hazards exist which should be overcome to in order to obtain satisfactory performance. For example, a substantial force may be required to urge such fittings together and to open the flow-control valves therein. Such a force may be difficult or impossible to supply manually, and excessively costly to supply through some external power-assist means. Further, large pressure-fluid-produced forces may exist between a pair of fittings (during connecting and disconnecting as well as while interconnected). With such the case, there is a danger that the fittings will be blown apart unless they are properly interlocked at all times when exposed to such forces.

A general object of the present invention, therefore, is to provide novel apparatus for disconnectably coupling a pair of conduits (where one conduit contains fluid under pressure) which take care of the above-indicated difficulties in a practical and satisfactory manner.

More specifically, an object of the invention is to provide such apparatus which employs a pair of interconnectable fittings, and which utilizes pressure fluid assistance—supplied by fluid in the conduit containing pressure fluid—to interconnect the fittings.

Another object is to provide apparatus of the type so far mentioned which includes pressure-fluid-actuated locking means which, during interconnecting of the fittings, and prior to the establishment of fluid communication between the conduits, locks the fittings together against separation.

A further object is to provide apparatus of the type so far indicated, wherein locking of, and subsequent interconnecting to establish communication, through, the fittings occurs automatically as the same are moved relatively toward one another.

According to the preferred embodiment of the invention, each fitting includes a fluid passage which, with the fitting in operative condition, is in communication with the interior of the conduit to which the fitting is attached. A shiftable closure means mounted on each fitting is biased to a position closing off the passage therein. One fitting is an outlet fitting, and is attached to the conduit containing pressure fluid which is to be supplied. The other fitting is an inlet fitting, and is attached to the other conduit which is to receive pressure fluid. With movement of the fittings relatively toward one another, the closure means in the two fittings shift to open the respective fluid passages.

Mounted on the outlet fitting is a normally closed pilot valve which is exposed to fluid inside the supply conduit. Mounted on the other fitting is an opener for this valve. On movement of the fittings toward one another, the opener opens the pilot valve—a relatively small amount of force being required to accomplish this. With opening of the pilot valve, pressure fluid is supplied to act against a plunger in the pressure-fluid-actuated locking means, which then automatically locks the fittings against separation. Locking occurs prior to shifting of the closure means to positions opening the above-mentioned fluid passages.

With actuation of the locking means, pressure fluid is then supplied through the pilot valve to a pressure-fluid-actuated driver (on the inlet fitting) which urges the fittings together to complete and maintain a connection therebetween.

An exhaust valve is provided which may be actuated to exhaust fluid supplied the driver means to relax the same and to accommodate disconnection of the fittings.

With such apparatus, the problems mentioned earlier are avoided. Pressure fluid in the conduit attached to the outlet fitting is utilized advantageously to perform most of the work in establishing the interconnection between the fittings. The locking means provided prevents the fittings from being blown apart at all times when large pressure-fluid-produced forces tend to separate them.

These and other objects and advantages attained by the invention will become more fully apparent as the description which follows is read in conjunction with the accompanying drawings, wherein:

FIG. 1 is a greatly simplified fragmentary top plan view illustrating a mobile irrigation structure employing coupling apparatus as contemplated herein;

FIG. 2 is a simplified side elevation on the same scale as, and taken from the bottom side of, FIG. 1;

FIG. 3 is an enlarged fragmentary side elevation partly in cross section illustrating, closely adjacent one another, a pair of fittings constructed according to the invention.

FIG. 4 is a fragmentary detail view, on a larger scale than FIG. 3, further illustrating certain parts in the fittings of FIG. 3;

FIG. 5 is a fragmentary cross-sectional view, on about the same scale as FIG. 4, taken along the line 5–5 in FIG. 4;

FIG. 6 is similar to FIG. 5, but shows certain parts in different positions;

FIG. 7 is a fragmentary view, on a smaller scale then FIG. 3, taken along the line 7–7 in FIG. 3;

FIG. 8 is an enlarged fragmentary view taken along the line 8–8 in FIG. 7; and

FIGS. 9 and 10 are enlarged fragmentary cross-sectional views taken along the lines 9–9 and 10–10, respectively, in FIG. 8.

Turning now to the drawings, and referring first to FIGS. 1 and 2, indicated generally at 10 is an end portion of an elongated articulated mobile irrigation structure which extends over a field shown partially at 12. The longitudinal axis of structure 12 is shown by dash-dot line 14 in FIG. 1. In order to obtain better clarity in the drawings, irrigation structure 10 has been illustrated in greatly simplified form, and without regard to exact proportions, since details of its construction form no part of the present invention.

In general terms, structure 10 comprises a plurality of longitudinal members 18 disposed end-to-end and in two spaced parallel rows. Extending between the rows of longitudinal members, from adjacent their confronting ends, are a plurality of transverse members 20 which are substantially paralleled to one another, and at right angles to members 18. Adjacent sets of ends of members 18, 20 are joined through suitable means which accommodates a certain amount of relative angular movement between the members to take care of unevenness in the ground. Members 18, 20 are supported above the ground, and for movement thereover, through upright legs 24 (see FIG. 2), and sets of wheels 26 which are carried adjacent the lower ends of the legs. Structure 10 is propelled over the ground, generally in the direction of arrow 28, which is substantially normal to axis 14, by suitable power-drive means (not illustrated). In the embodiment illustrated, structure 10 travels at a speed of about 1 mile per hour. The longitudinal and transverse members in structure 10 are employed to carry a suitable water distribution system including sprinkler devices, such as those shown at 22 (see FIG. 1) on the transverse members.

Structure 10 is adapted, while traveling over the ground, and by virtue of employing the present invention, to receive a continuous supply of water from a pair of main water conduits 30, 32, which extend along the ground. These conduits are disposed substantially parallel to one another, and parallel to the path along which structure 10 travels. Conduits 30, 32 (referred to also as a source) contain water at a pressure of about 100 lbs. per square inch. They each have an inside diameter of about 4 inches.

Explaining briefly the means employed to transfer water from conduits 30, 32 to the water distribution system on structure 10, indicated at 34, 36, 38 in FIG. 1 are elongated transverse supports which extend between and are mounted on the two longitudinal members which form part of the end of structure 10 shown in the figure. Supports 34, 38 are disposed substantially directly over conduits 30, 32 respectively. Mounted for reciprocation along support 34 are carriages 40, 42. Carriages 44, 46, similar to carriages 40, 42, respectively, are mounted for reciprocation along support 38. Carriages 42, 46 are interconnected through a cable shown by phantom lines 48. Opposite ends of cable 48 are anchored to these two carriages respectively, and the cable is trained about a pulley 50 suitably mounted adjacent the left end of support 36 in FIG. 1. As a consequence of the interconnection provided by this cable, with carriage 46 moved along support 38 in a direction to the right in FIG. 1, carriage 42 is pulled along support 34 an equal distance to the left in FIG. 1. The reverse action takes place with with carriage 42 moved to the right in FIG. 1 along support 34.

Indicated in dashed lines at 52, 54 are elongated flexible hoses, or conduits. The inner ends of the hoses are connected to a junction unit 56 through which each of the hoses communicated with the water distribution system on structure 10. From its inner end, hose 52 extends about a sheave 58 rotatably mounted on carriage 42, and from there extends to carriage 40. Hose 52 is suitably anchored to carriage 40, and extend from this carriage to an outer lower end 52a (see FIG. 2) which hangs below the carriage. Similarly, hose 54 extends from its inner end about a sheave 60 rotatably mounted on carriage 46. From sheave 60, hose 54 extends toward and is suitably anchored to carriage 44. The outer end of hose 54, 54a (seen in FIG. 2), hangs below carriage 44. Each hose has an inside diameter of about 4 inches.

Referring particularly to FIG. 2, attached to the outer ends of hoses 52, 54 are inlet fittings 62, 64, respectively. Fittings 62, 64 are similar to one another, and are constructed according to the invention. Details of their construction will be fully described later. Providing support for the downwardly hanging outer ends of the hoses are cables 66, 68 which extend from fittings 62, 64, respectively to carriages 40, 44, respectively.

Mounted on and extending upwardly from conduits 30, 32 at points spaced along the lengths thereof are upright outlet pipes, or conduits, such a pipe 70 on conduit 30, and pipes 72, 74 on conduit 32 (see FIG. 2). The axes of pipes 70, 72, 74 are inclined upwardly and to the right in FIG. 2. Progressing along the lengths of the conduits 30, 32, the outlet pipes on conduit 30 alternate with those on conduit 32. In addition, each outlet pipe on a conduit is equally spaced from the next adjacent outlet pipes on the other conduit. Each outlet pipe herein has an inside diameter of about 4 inches.

Mounted on the tops of the various outlet pipes are outlet fittings, such as fittings 76, 78, 80 on pipes 70, 72, 74, respectively. These outlet fittings, which are similar to one another, are constructed according to the present invention, and will be more fully described later. The inlet fittings previously mentioned (on the outer ends of the hoses) are adapted to interconnect with the outlet fittings. More specifically, and by virtue of relative lateral positioning, inlet fitting 62 is adapted to interconnect with the outlet fittings mounted above conduit 30, and inlet fitting 64 is adapted to interconnect with the outlet fittings mounted above conduit 32. Inlet fitting 62 is shown in a condition interconnected with fitting 76.

Considering now in detail the construction of an outlet fitting and referring to FIG. 3 which shows fitting 80, the fitting includes a generally cylindrical body, or body member 82, having the cross-sectional configuration shown. Extending axially through body 82 is a passage defined by axially aligned bores 84, 86 to adjacent the top of the body in FIG. 3, and bulging chamber 88 adjacent the base of the body in the figure. Bore 84 has slightly greater inside diameter than does bore 86, and where these two bores meet, a ledge 90 is formed in the body. Body 82 seats upon a ring 94 which in turn seats upon an annular flange 96 fastened as by welding to the top of pipe 74 in FIG. 3. It should be noted that in order to make better use of available space on the sheet of drawings containing FIG. 3, pipe 74 is illustrated with its axis upright, rather than inclined upwardly and to the right. The body is anchored in place by means of bolts such as those shown at 98 which extend through the flange and ring. Suitable means is provided for forming a watertight seal between flange 96 and ring 94, and between ring 94 and body 82.

Joined as by welding to the inside of ring 94 is a diametral web 100, to the center of which is suitably joined an upwardly projecting cylindrical pin 102. The axis of pin 102 substantially coincides with the axis of body 82. Encompassing pin 102, and resting on the top of web 100 in FIG. 3, is an annular spring seat 104. Fastened to pin 102 by means of a roll pin 106 is an elongated tube 108 whose axis also substantially coincides with the axis of body 82. Immediately above the top of pin 102, the sidewall of tube 108 is provided with a pair of bores 110.

Suitably secured to the upper end of tube 108 in FIG. 3 is a fixture 111. Referring to FIGS. 4—6 along with FIG. 3, the lower portion of the fixture in the figures is cylindrical and is fitted snugly inside the upper end of tube 108. The upper portion of the fixture, when viewed generally from above and along the axis of body 82, has a rectangular peripheral outline. Where the upper and lower portions of the fixture join with one another, a ledge 112 is formed which seats on top of tube 108 and extends radially outwardly of the tube. The lower portion of fixture 111 includes a bore 114 which communicates with the interior of tube 108. The upper end of bore 114 in the figures terminates in a generally conical valve seat 116 above which is a port 118. Bore 114, valve seat 116 and port 118 are aligned axially with tube 108.

Formed on the upper portion of fixture 111 in the figures is a pair of opposed spaced-apart catches, or locking elements, 120. The cross-sectional outlines of the catches are shown clearly in FIGS. 5 and 6, wherein it will be noted that the catches include upwardly facing inclined guide surfaces 120a, and downwardly facing ledges 120b. Still referring to FIGS. 5 and 6, provided adjacent the bases of the catches, directly below ledges 120b are upwardly facing inclined guide surfaces 120c. Referring to FIG. 4, extending between and joining with the catches adjacent their bases are spaced-apart webs 122, 124. Webs 122, 124 define inclined guide surfaces 122a, 124a. It will be noted that surface 122a is somewhat longer than surface 124a. The reason for this will be explained later.

Referring again particularly to FIG. 3, slidably mounted on the outside of tube 108 is a closure assembly, or means, 126. Assembly 126 includes upper and lower sections 128, 130, respectively, which are joined together in any suitable fashion. Upper section 128 includes a generally bell-shaped central portion 128a having the cross-sectional configuration shown. Joined integrally with and radiating outwardly from the outside of central portion 128a are a plurality of axially extending vanes, such as vanes 128b, which join with an annular ring 128c. A seal 132 seals section 128 to the outside of tube 108. A bumper 134 is joined to the upper end of central portion 128a in FIG. 3, and is adapted to seat against ledge 112 with assembly 126 occupying the position in which it is shown in solid outline.

Lower section 130 has a shape which is somewhat similar to that of central portion 128a just described. The lower section includes a downwardly facing socket 136. An annular seal 138 mounted on the outside of lower section 130 provides a watertight seal between sections 128, 130, and when located within bore 86 as shown in solid outline, provides a watertight seal between assembly 126 and the inside of the bore. Preferably, sections 128, 130 are made of a plastic material such as the product known as "Delrin" manufactured by E. I. duPont de Nemours and Co.

Assembly 126 is biased to its solid outline position by means of a coil spring 140. Spring 140 surrounds tube 108, and acts between spring seat 104 and the upper end of socket 136. With assembly 126 in its solid outline position, the assembly blocks fluid flow through the passage in body 82. With assembly 126 shifted downwardly along tube 108 to disengage seal 138 and the wall of bore 86, fluid flow is permitted through the passage.

Disposed freely within the inside of tube 108 and bore 114 is a valve member including an elongated stem 142 and an integral generally conical head, or closure part, 144. Preferably, this valve member is made of the same plastic mentioned above for sections 128, 130. An annular seal 146 mounted on head 144 provides a watertight seal between the head and valve seat 116, blocking flow through port 118 with the head in the position shown in FIG. 3. Head 144 and port 118 constitute a pilot valve herein which forms part of what is referred to as a fluid communicator means. Formed in head 144 is an upwardly facing hemispherical socket 144a. Projecting radially outwardly from adjacent the lower end of stem 142 in FIG. 3 are pins, such as pin 148. A coil biasing spring 150 acts between pins 148 and the upper end of pin 102. Spring 150 urges head 144 and seal 146 to a position blocking flow through port 118.

Considering the construction of an inlet fitting, and referring still to FIG. 3 which shows fitting 64, this fitting includes a body, or body member, 152 having the cross-sectional configuration shown in FIG. 3. Curving through the lower portion of body 152 in FIG. 3 is a passage including a bore 154, a chamber 156 and a bore 158. Bore 154 is defined by cylindrical wall 160, and has a substantially upright axis in FIG. 3. Bore 158 is defined by a cylindrical wall 162, and has a substantially horizontal axis in FIG. 3. Defining the top of chamber 156 in FIG. 3 is an annular wall, or flange, 164 containing a central bore 166. Bore 166 is aligned axially with, and has substantially the same inside diameter as bore 154. Wall 164 constitutes a driver means herein. Extending above wall 164 in FIG. 3 is a cylindrical wall 168, on the right side of which in the figure is formed an enlargement 170 (see also FIG. 7).

Fastened to and closing off the upper end of wall 168 is a circular member 172 which includes a downwardly facing socket 182 in FIG. 3. Member 172 is held in place by means of an integral finger 174, which fits in a notch 176 formed in wall 168, and by means of a retaining ring 178 mounted in a groove on the wall. An annular seal 180 seals the outside of member 172 to the inside of wall 168.

Still referring particularly to FIG. 3, slidably mounted on body 152 within bore 166 is a generally cylindrical spool 184 having the cross-sectional configuration shown. An annular seal 186 mounted on wall 164 provides a watertight seal between bore 166 and spool 184. Adjacent its upper end in FIG. 3, the spool includes a radially outwardly extending annular flange 188. The periphery of flange 188 is disposed closely adjacent the inside of wall 168, and the outside of the flange is sealed to this wall by means of an annular seal 190 mounted on the flange. Flange 188 and wall 164 define the upper and lower extremities, respectively, of a chamber 189. Located between spool 184 and member 172 is a chamber 187.

Formed within spool 184 are axially aligned bores 192, 194, 196. Bore 192 has a somewhat greater inside diameter than does bore 194, and where these two bores meet a shoulder 198 is formed. Bore 194 has a larger inside diameter than does bore 196, and where these two bores meet, there is a shoulder 200.

Mounted on the spool adjacent the base of bore 192 in FIG. 3 is a generally cylindrical member, or reaction means, 202. Formed on the base of member 202 are a plurality of downwardly projecting feet, such as feet 204. Member 202 is seated against shoulder 198, and is held in place on this shoulder by a retaining ring 206 mounted in a groove in bore 192. The spool is biased to the position in which it is shown in solid outline in FIG. 3 (relative to body 152) by means of a spring 208 which acts between the upper end of socket 182 and the top surface of member 202. The outside of member 202 is sealed to the inside of bore 192 by an annular seal 210 mounted on the member.

Slidably mounted within bore 194 is a plunger 212 which is sealed to the inside of the bore by an annular seal 214 mounted on the plunger. Joined to and projecting downwardly from the plunger is a elongated pin 216, the lower end of which is freely received in a socket 218 formed in the spool. Pin 216 and socket 218 prevent angular movement of the plunger about its axis relative to the spool. The plunger is biased to the position in which it is shown where it is seated against the bases of feet 204 by a spring 220. Spring 220 acts between the plunger and the base of bore 196. A chamber 222 is defined between member 202 and plunger 212.

Considering now FIG. 3 and 4 together, suitably joined to and extending axially downwardly from plunger 212 is an elongated tube 224. The upper end of the tube communicates through a bore 226 in the plunger with chamber 222. The lower portion of the tube extends slidably through a bore 228 formed in the base of the spool. Tube 224 and spool 184 are sealed together by an annular cup seal 230 which is disposed within a socket 232 formed adjacent the base of bore 196 in the spool. Seal 230 is held in place in socket 232 by a retaining ring 234.

Referring to FIGS. 5 and 6 along with FIGS. 3 and 4, suitably secured to the lower end of tube 224 in the figures is an element 236. Element 236 includes a cam 238 formed integrally with an elongated downwardly projecting prong 240. Element 236 preferably is formed of the same type of plastic material mentioned earlier for sections 128, 130. Referring particularly to FIGS. 5 and 6, cam 238 includes on opposite sides cam surfaces 238a. Surfaces 238a diverge progressing upwardly in FIGS. 5 and 6. The outside diameter of prong 240 is somewhat smaller than the inside diameter of port 118 in fixture 111. The outside surface of the bottom end of the prong in these figures is hemispherical, and adapted to fit within socket 144a. Prong 240 constitutes a valve opener herein. Extending axially along the inside of prong 240 is a bore 242, the upper end of which in the figures communicates with the interior of tube 224. The lower end of bore 242 joins with a cross-bore 244 which extends completely through the prong at substantially a right angle to bore 242. Bores 226, 242, 244, and the inside of tube 224 constitute a channel herein. This channel, and prong 240, form part of the fluid communicator means mentioned earlier.

Chamber 189 communicates with chamber 222 through a pair of passages 191, 193 which are suitably formed in the sidewall of the spool. The region inside the spool beneath plunger 212 in FIG. 3 communicates with the atmosphere through a passage 195 suitably formed in the spool and elongated tube 197. Tube 197 is anchored to the spool and extends axially upwardly therefrom in FIG. 3 slidably through a suitable accommodating bore (not shown) provided in member 172. Tube 197 moves as a unit with the spool and the outside of the tube is sealed to member 172 by a suitable seal.

Mounted on spool 184 adjacent the base thereof through a conventional spherical bearing assembly 246 is a generally cylindrical closure member 248 having the cross-sectional configuration illustrated. Referring particularly to FIG. 4, bearing assembly 246 is held in place against a shoulder 249 on the spool by means of a retaining ring 250. Member 248 is held in place on the bearing assembly through a shoulder 251 on the member, and a retaining ring 252. It will be noted from an examination of FIG. 4 that member 248 does not fit snugly against the base of spool 184. Rather, it is permitted a limited amount of universal movement relative to the spool, such movement being accommodated by bearing assembly 246. Closure member 248 is sealed to the spool by an annular cup seal 254.

Referring now to FIGS. 4, 5 and 6, indicated at 256 are two elongated resilient latches, or locking elements. Each latch takes the form of a flat blade, bent to have the side outline shown in FIGS. 5 and 6. The outer ends of each latch is provided with a hook 258 that extends across the width of the latch, and the inner end is provided with a similar hook 260. The latches employed herein are formed from resin-impregnated fiberglas. Latches 256, together with catches 120, cam portion 238 and plunger 212 constitute a pressure-fluid-actuated locking means herein.

Latches 256 are mounted in spaced opposing relationship adjacent the base of closure member 248 in the figures by means of a clamp plate 262 and screws 264 (see FIG. 4). The latches fit as shown within a pair of opposed recesses 266 formed in plate 262, and extend downwardly through a central rectangular opening 268 in the plate. Opening 268 also provides clearance for element 236 and tube 224. The ends of the latches having hooks 260 are spaced closely adjacent the sides of cam portion 238 having cam surfaces 238a (see FIG. 5). Two elongated resilient bumpers 270 are suitably mounted on the bottom side of plate 262 adjacent opposite sides of opening 268 (see FIGS. 5 and 6).

Completing the description of fitting 64, and referring to FIGS. 3 and 7—10, indicated generally at 272 is a valve for controlling the exhaust of fluid from different chambers in the fitting. The valve includes a valve body 274 mounted on top of enlargement 170 in the figures including a bore 276 (see FIGS. 7, 9 and 10). Rotatably mounted inside bore 276 is a cylindrical valve spool 278 which includes a pair of axially spaced right-angled passages 280, 282 oriented relative to one another as shown. Extending upwardly through body 274 from bore 276 are ports 284, 286. Ports 284, 286, the upper ends of which are open to the atmosphere, are adapted to communicate with passages 280, 282, respectively.

Communicating with bore 276 in the plane of passage 280, and at the location shown in FIG. 9, is an elongated passage 288 suitably formed in body 274. Passage 288 communicates with an elongated passage 290 in enlargement 170, the latter passage communicating with the interior of chamber 187. Communicating with bore 276 at a point diametrically opposite port 284 is a passage 292 in body 274. Passage 292 extends downwardly through the body, and communicates with an elongated passage 294 in enlargement 170 which opens to the interior of chamber 156. Communicating with bore 276 in the plane of passage 282, and at the location shown in FIG. 10, is an elongated passage 296 suitably formed in body 274. Passage 296 communicates with an elongated passage 298 in enlargement 170 which opens to the interior of chamber 189.

With valve spool 278 occupying the position shown in FIGS. 9 and 10, chamber 187 is exhausted to the atmosphere through passages 288, 290, 280 and port 284. Chamber 156 is blocked through passages 292, 294, and chamber 189 is blocked through passages 296, 298. With spool 278 rotated to another position 90° counterclockwise in FIGS. 9 and 10, chamber 156 communicates with chamber 187 through passages 288, 290, 280, 292, 294, and chamber 189 is exhausted to the atmosphere through passages 296, 298, 282 and port 286. Suitable means is provided in valve 272 for limiting rotation of spool 278 between the positions just described.

In the embodiment illustrated, spool 278 is rotated by a conventional torsion cable 300 (see FIG. 3) having its outer end suitably connected to the spool. Cable 300 extends from spool 278 upwardly along hose 54 to an inner end located on structure 10. Suitable means is provided on structure 10 for actuating the cable at the appropriate times, as will be more fully explained.

Mounted on the lower end (see FIG. 3) of wall 160 in body 152 is an annular bumper 301 made preferably of the same plastic described above for sections 128, 130. Also mounted on wall 160, immediately above bumper 301 in FIG. 3 is a seal, or sealing means, 302. Seal 302 is adapted to produce a watertight seal between bodies 152, 82.

Fitting 64 is attached to hose end 54a through an angular pipe, or conduit, 304. The right end of pipe 304 in FIG. 3 is suitably fastened within bore 158. Hose end 54a is secured to the left end of the pipe by a clamp 306. The lower end of previously mentioned support cable 68 is attached to a bracket 308 which is mounted on valve body 274.

Explaining now how the inlet and outlet fittings described herein cooperate, and referring to fittings 64, 80, prior to interconnection of these fittings, the various parts therein occupy the positions in which they are shown in solid outline in FIG. 3. Valve spool 278 occupies the position shown for it in FIGS. 9 and 10. As a consequence, no fluid flow is permitted through the main fluid passages in either of the fittings.

With movement of fitting 64 toward fitting 80, and with element 236 fairly closely axially aligned with the axis of fitting 80, guide surfaces 120a, 120c, 122a, 124a on fixture 111 guide the lower end of prong 240 toward and into port 118. The relative positioning of the fittings and of the parts therein as the prong enters port 118 is illustrated in FIG. 5.

With further movement of fitting 64 toward fitting 80, the lower end of the prong seats in socket 144a. The relative positioning of the various parts in this situation is illustrated in FIGS. 3 and 4. With continued movement of fitting 64 a slight amount further toward fitting 80, prong 240 shifts head 144 downwardly away from valve seat 116 against spring 150. According to an important feature of the invention, only a minimal amount of force is required to urge head 144 away from valve seat 116 as just described. In the embodiment illustrated, and with the sizes and water pressure described, this force is about 20 pounds.

With head 144 thus shifted away from seat 116, pressurized water from the inside of chamber 88 (which is supplied from conduit 32) flows through bores 110, tube 108 and bores 244, 242 to the interior of tube 224. Thence, water flows through bore 226 to the interior of chamber 222, passages 193, 191, and chamber 189.

The relative strengths of springs 208, 220, and the relative areas of the bottom side of flange 188 and the top side of plunger 212, are such that with pressure fluid introduced into chambers 189, 222 as just described, plunger 212 moves relative to the spool before the spool moves relative to body 152. More specifically, in the embodiment illustrated, plunger 212 shifts when the pressure of fluid in chamber 222 is about 5 p.s.i., and spool 184 shifts relative to body 152 when the pressure of fluid in chamber 189 is about 25 p.s.i.

Thus, with pressurized water supplied chamber 222, plunger 212 shifts downwardly away from member 202 in FIG. 3 to a position against shoulder 200. This shifts tube 224 and element 236 downwardly relative to spool 184 to a position such as that shown in FIG. 6. With such shifting of element 236, cam surfaces 238a shift the exposed ends of latches 256 to positions with hooks 260 caught beneath ledges 120b in catches 120. When this occurs, spool 184 becomes locked in place relative to fitting 80, and fitting 64 is prevented from separating from fitting 80. In the embodiment illustrated, the time required from initial movement of head 144 away from valve seat 116 to locking of the two fittings together is about one-tenth second.

It should be noted that such locking action occurs with closure assembly 126 and closure member 248 still closing off bores 86, 154, respectively. Thus, locking occurs prior to the establishment of fluid communication between conduit 32 and hose 54, and hence, prior to the time when a maximum water pressure produced force tending to separate the fittings is applied thereto. This is an important feature in preventing the fittings from being blown apart during the process of becoming interconnected.

The relative universal movement permitted between spool 184 and closure member 248 (which carries the latches) by bearing assembly 246 minimizes the chance of overstressing the latches should there be any wobble in the spool relative to fixture 111.

With the plunger shifted against shoulder 200, pressurized water in chamber 189 then reacts between wall 164 and flange 188 and causes body 152 to be driven downwardly in FIG. 3 relative to spool 184 toward fitting 80. With such movement of body 152, seal 302 engages the inside of bore 84 and establishes a sealed relationship between the fittings. Thereafter, the main fluid flow passages through the fittings are opened. Initial opening of these passages occurs about one-tenth second after locking together of the fittings.

Further explaining, with movement of body 152 toward fitting 80 and relative to spool 184, wall 160 shifts downwardly in FIG. 3 relative to closure member 248 to open up bore 154. Bumper 301 through engagement with ring 128c, drives closure assembly 126 downwardly into chamber 88 to open up bore 86. The bulge in chamber 88 permits water to flow past assembly 126. With bores 166, 154 having substantially the same inside diameters, should any pressurized water be present in hose 54 prior to opening of bore 154, such water will produce no net axial force on spool 184 which must be overcome during interconnecting of the fittings. Further, this feature tends to minimize stressing in latches 256.

Movement of body 152 toward fitting 80 stops with engagement of bumper 301 and ledge 90. Body 152 and closure assembly 126 then occupy the dash-dot outline positions shown therefor in FIG. 3, and fluid flow is permitted from conduit 32 to hose 54.

Pressurized water acting in chamber 189, and acting against the lower face of closure member 248 and clamp plate 262 with bores 154, 86 open, serves to hold the fittings in interconnected relation. The force tending to separate the fittings is resisted by latches 256, an catches 120.

To effect disconnecting of the fittings, valve spool 278 is rotated 90° in a counterclockwise direction in FIGS. 9 and 10. With this adjustment, and as was previously indicated, chamber 189 is exhausted to the atmosphere and chambers 156, 187 are connected together. Pressurized water is then supplied chamber 187 wherein it acts between the upper surfaces of spool 184 and member 202, and the lower surface of member 172 in FIG. 3. This action, plus that produced by spring 208, returns body 152 to the position which it has relative to spool 184 prior to the two fittings becoming interconnected. During return movement of body 152, bores 86, 154 become closed off to stop fluid flow from conduit 32 to hose 54. Thereafter, seal 302 disengages the inside of bore 84 to break the sealed relationship between the fittings. And it should be noted that during this return movement of body 152, spool 184 remains locked to fitting 80. Thus, blowing apart of the fittings is prevented.

With body 152 thus returned, fluid exhausts from chamber 222 through passages 193, 191 and chamber 189 which is exhausted to the atmosphere. As a consequence, spring 220 returns plunger 212 to a position engaging feet 204 of member 202. With return movement of the plunger, cam portion 238 shifts upwardly to permit return of latches 256 to the positions which they originally had relative to one another, and spool 184 becomes unlocked from fitting 80. The fittings are then free to separate.

Considering now how the fittings of the invention perform in conjunction with mobile irrigation structure 10, and referring again to FIGS. 1 and 2, fittings 62, 76, are connected and fittings 64, 80 are disconnected with the structure in the position shown over conduits 30, 32. With this situation, fluid is supplied the water distribution system on structure 10 through fittings 76, 62 and hose 52.

With movement of the structure in the direction of arrow 28, fitting 64 is guided in any suitable manner toward fitting 80. Such guiding might be done for example, by an appropriate stationary guide structure positioned adjacent fitting 80 adapted to gather in an oncoming inlet fitting, and guide the same to a position with its prong properly aligned (as earlier described) with the outlet fitting. Final guiding of the prong to a position engaging head 144, of course, is accomplished by guide surfaces 120a, 120c, 122a, 124a. Guide surface 122a generally faces the direction from which fitting 64 approaches fitting 80 with travel of structure 10, and its greater length (i.e., greater than that of guide surface 124a) minimizes the chance that prong 240 will overshoot fixture 111. In applications other than the present one disclosed for the fittings, surfaces 122a, 124a might be constructed to be substantially the same. Movement of fitting 64 at the speed of structure 10 mentioned earlier is sufficient to cause prong 240 to shift valve head 144 in the manner described above. As a consequence, fittings 64, 80 become automatically locked against separation, and interconnected.

With interconnecting of fittings 64, 80 the valve spool in fitting 62 which corresponds to spool 278 in fitting 64 is actuated (i.e., rotated) to cause fittings 62, 76 to become disconnected. This is accomplished by the means mentioned earlier provided on structure 10 for actuating such a valve spool at the appropriate time. Such actuating means may be constructed in any suitable fashion. Water is then supplied the water distribution on structure 10 from conduit 32 through fittings 80, 64 and hose 54.

As structure 10 continues to move in the direction of arrow 28, the means provided for actuating the valve spool just mentioned in fitting 62 returns the spool (rotates it in the reverse direction) to the position which it had with fittings 62, 76 connected. The carriages on supports 34, 38 adjust the relative positions of the hoses on structure 10 whereby the end 52a of hose 52 and fittings 62 are moved toward the next adjacent outlet fitting on conduit 30. As the structure continues to move, fitting 62 is guided toward this next outlet fitting, and subsequently becomes automatically interconnected with the fitting. Thereupon, fittings 64, 80 become disconnected.

This type of operation continues with continued movement of structure 10 along conduits 30, 32.

Thus, the invention provides novel interconnectable fittings which take care of the problems mentioned earlier. Only a relatively small outside force is required to cause the fittings to become interconnected, since most of the work during interconnection is produced by pressure fluid contained in the conduit attached to the outlet fitting. Blowing apart of the fittings, either during connection or disconnection, is prevented by virtue of the novel pressure-fluid-actuated locking means provided which locks the fittings against separation prior to the establishment of fluid communication between the conduits being connected together.

While a preferred embodiment of the invention has been described herein, it is appreciated that variations and modifications may be made without departing from the spirit of the invention.

I claim:

1. Apparatus for disconnectably coupling a pair of conduits where at least one conduit contains fluid under pressure, said apparatus in operative condition comprising a pair of relatively movable interconnectable body members, with one attached to said one conduit and the other attached to the other conduit, means in each body member defining a fluid passage communicating with the interior of the conduit to which the member is attached, said fluid passages being adapted to communicate with each other with the body members interconnected, adjustable closure means in each fluid passage biased to one position closing the passage and shiftable to another position opening the passage, the closure means in the two passages being constructed to shift toward their said other positions on movement of the body members toward one another to become interconnected, pressure-fluid-actuated locking means actuatable releasably to lock said body members against separation, fluid communicator means operatively connected to said locking means including a channel effective to communicate pressure fluid from the interior of said one conduit to said locking means to actuate the latter with relative movement of the body members toward one another and prior to said closure means occupying their said other positions, and pressure-fluid-actuated driver means operatively connected to said other body member and positioned to be acted upon by fluid supplied through the channel in said fluid communicator means, operable with said body members locked by said locking means against separation to urge said other body member toward said one body member through the action of such fluid on the driver means.

2. The apparatus of claim 1 which further comprises a spool mounted for reciprocation on said other body member with the spool and other body member permitted a limited amount of relative reciprocation, and wherein said locking means when actuated locks in said spool in a substantially fixed position relative to said one body member.

3. The apparatus of claim 2, wherein said pressure-fluid-actuated locking means includes a pair of relatively movable locking elements which become locked together upon relative movement therebetween in one direction, one of said locking elements being mounted on said one body member and the other being mounted on said spool, and a shiftable cam mounted for movement on said spool which shifts under the influence of pressure fluid in said channel and produces relative movement of said locking elements in said one direction through engaging at least one of said elements.

4. The apparatus of claim 3, wherein said other body member contains one fluid chamber into which fluid supplied through said channel is introduced to actuate said locking means, and another fluid chamber into which such fluid is introduced to actuate said driver means, said chambers communicating with one another, and fluid having one pressure is required in said one chamber to actuate said locking means, and fluid having another pressure greater than said one pressure is required in said other chamber to actuate said driver means.

5. The apparatus of claim 4, wherein said locking means further includes a movable plunger mounted for movement on said spool operatively connected to said cam and exposed to the interior of said one chamber, said one chamber is defined between the plunger and a reaction means joined to said spool, an actuation of said locking means results from the reaction of fluid in said one chamber between said reaction means and said plunger producing relative movement between the plunger and spool in one direction.

6. The apparatus of claim 2, wherein the closure means in said other body member's fluid passage is mounted on said spool through means accommodating limited universal movement of the closure means relative to the spool, and said other locking element is mounted on said spool through such closure means.

7. The apparatus of claim 2, wherein said other body member contains one fluid chamber into which fluid supplied through said channel is introduced to actuate said locking means, and another fluid chamber into which such fluid is introduced to actuate said driver means, said chambers communicating with one another, and fluid having one pressure is required in said one chamber to actuate said locking means, and fluid having another pressure greater than said one pressure is required in said other chamber to actuate said driver means.

8. The apparatus of claim 7, wherein said driver means takes the form of a flange on said other body member on which fluid can act, said flange being exposed to the interior of said other fluid chamber, said other fluid chamber is defined between said flange and said spool, and actuation of the driver means results from the reaction of fluid in said other chamber between the flange and spool producing relative movement between the spool and other body member in one direction.

9. The apparatus of claim 7 which further comprises means for releasing said locking means and effecting disconnection of said body members including exhaust valve means actuatable to exhaust fluid from said chambers.

10. The apparatus of claim 9, wherein said releasing means further comprises a biasing spring operatively interposed between said plunger and said spool, and another biasing spring operatively interposed between said spool and said other body member, said biasing springs tending to counteract the reaction of fluid in said chambers.

11. The apparatus of claim 10, wherein said releasing means further comprises a surface area on said spool on which pressure fluid may act to assist said other biasing spring, and valve means which operates with said exhaust valve means adjusted to exhaust fluid from said chambers to communicate fluid from the interior of the fluid passage in said other body member to said surface area.

12. The apparatus of claim 1 which further comprises sealing means adapted to establish a sealed relationship between said body members with relative movement of the body members toward one another and prior to said closure means occupying their said other positions.

13. Apparatus for disconnectably coupling a pair of conduits where at least one conduit contains fluid under pressure, said apparatus in operative condition comprising a pair of relatively movable interconnectable body members, with one attached to said one conduit and the other attached to the other conduit, means in each body member defining a fluid passage communicating with the interior of the conduit to which the member is attached, said fluid passages being adapted to communicate with each other with the body members interconnected, adjustable closure means in each fluid passage biased to one position closing the passage and shiftable to another position opening the passage, the closure means in the two passages being constructed to shift toward their said other positions on movement of the body members toward one another to become interconnected, pressure-fluid-actuated locking means actuatable releasably to lock said body members against separation, fluid communicator means operatively connected to said locking means including a channel effective to communicate pressure fluid from the interior of said one conduit to said locking means to actuate the latter with relative movement of the body members toward one another and prior to said closure means occupying their said other positions, said fluid communicator means further including a normally closed pilot valve mounted on said one body member, and a valve opener mounted on said other body member operable to open said pilot valve with relative movement of said body members toward one another.

14. The apparatus of claim 13, wherein said pilot valve includes a port through which fluid in said one conduit may flow with the pilot valve open, said valve opener is adapted to extend into said port with opening of the pilot valve and a portion of said channel is formed in said valve opener and is adapted to communicate with said port with the valve opener extending into the port.

15. The apparatus of claim 14, wherein said pilot valve further includes a shiftable closure part biased to one position closing said port and shiftable to another position opening the port, and said valve opener takes the form of an elongated prong which with relative movement of the body members toward one another engages said closure part and shifts the same from its said one to its said other position.

16. The apparatus of claim 15 which further comprises guide means adjacent said port adapted to guide said prong to a position engaging said closure part and extending into said port with relative movement of the body members toward one another.